United States Patent
Inagaki et al.

(10) Patent No.: US 11,611,683 B2
(45) Date of Patent: Mar. 21, 2023

(54) SERVER AND COMPUTER PROGRAM FOR SERVER

(71) Applicant: BROTHER KOGYO KABUSHIKI KAISHA, Nagoya (JP)

(72) Inventors: Tomohiro Inagaki, Nagoya (JP); Kumi Hatada, Tokai (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

(21) Appl. No.: 17/679,336

(22) Filed: Feb. 24, 2022

(65) Prior Publication Data

US 2022/0279091 A1 Sep. 1, 2022

(30) Foreign Application Priority Data

Feb. 26, 2021 (JP) .............................. JP2021-030862

(51) Int. Cl.
*H04N 1/44* (2006.01)
*H04L 9/40* (2022.01)

(52) U.S. Cl.
CPC ......... *H04N 1/4413* (2013.01); *H04L 63/083* (2013.01); *H04N 1/4433* (2013.01)

(58) Field of Classification Search
CPC ... H04N 1/4413; H04N 1/4433; H04L 63/083
See application file for complete search history.

(56) References Cited

U.S. PATENT DOCUMENTS

| | | | |
|---|---|---|---|
| 8,719,952 B1* | 5/2014 | Damm-Goossens | ........................ H04L 9/3226 726/28 |
| 2010/0218241 A1* | 8/2010 | Faryna | ..................... G06F 21/35 726/5 |
| 2014/0282996 A1 | 9/2014 | Mori | |
| 2019/0050170 A1* | 2/2019 | Ren | ....................... G06F 3/1222 |

FOREIGN PATENT DOCUMENTS

JP 2014-178984 A 9/2014

\* cited by examiner

*Primary Examiner* — Juan M Guillermety
(74) *Attorney, Agent, or Firm* — Scully, Scott, Murphy & Presser, PC

(57) ABSTRACT

A server includes memory, a request receiver, a first transmitter, a second transmitter, and a first memory controller. The memory includes a first table to store first identification information identifying a communication device and first user information in association with each other. In response to a reset instruction to reset first identification information being input at a communication device storing the first identification information, the request receiver receive the first identification information, and an identification information request from the communication device. The first transmitter transmits second identification information different from the first identification information to the communication device. The second transmitter transmits the first identification information to the communication device, the first identification information being to be stored in the communication device instead of the second identification (Continued)

information. The first memory allows the first table to store the second identification information and second user information in association with each other.

16 Claims, 8 Drawing Sheets

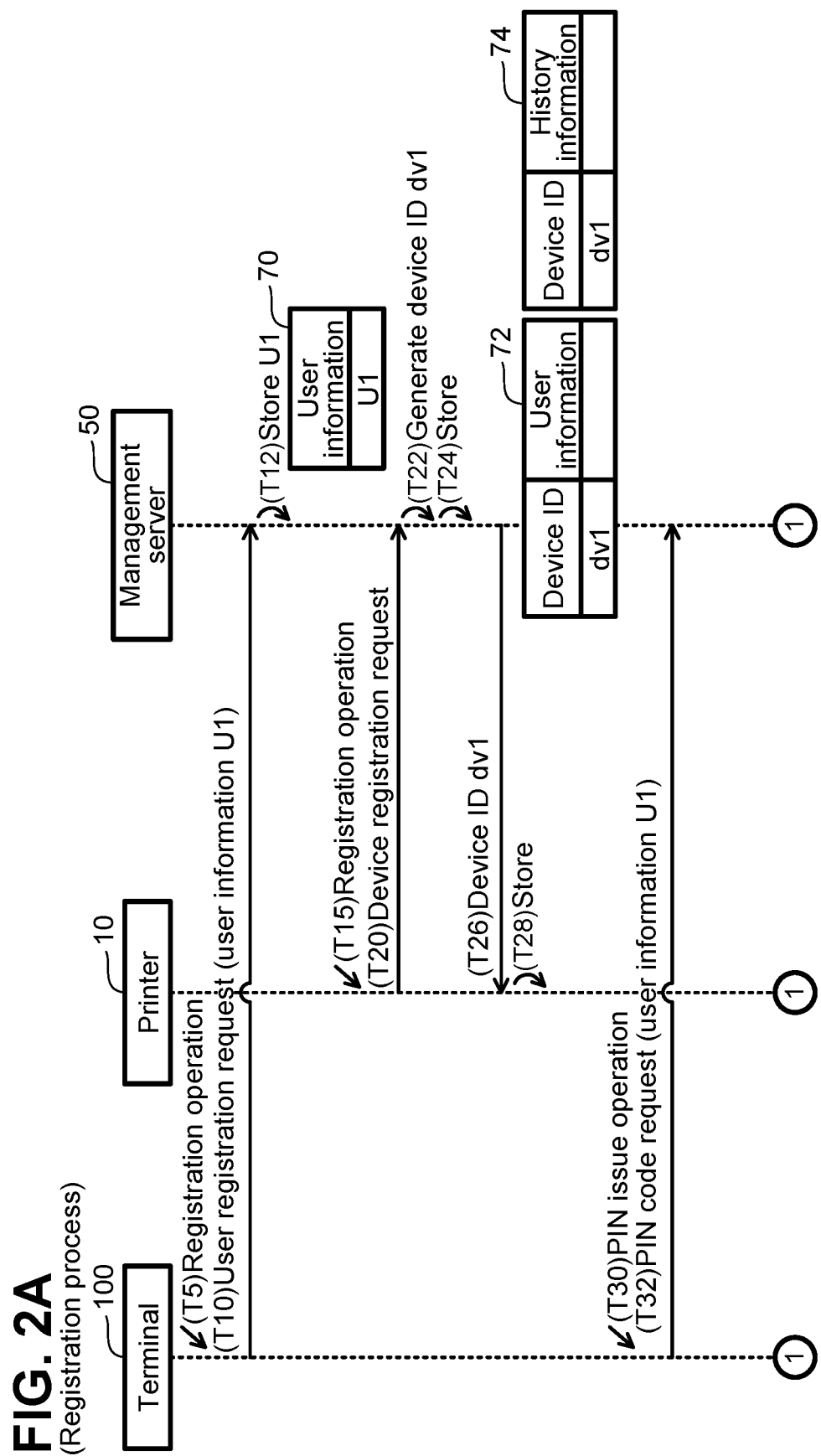

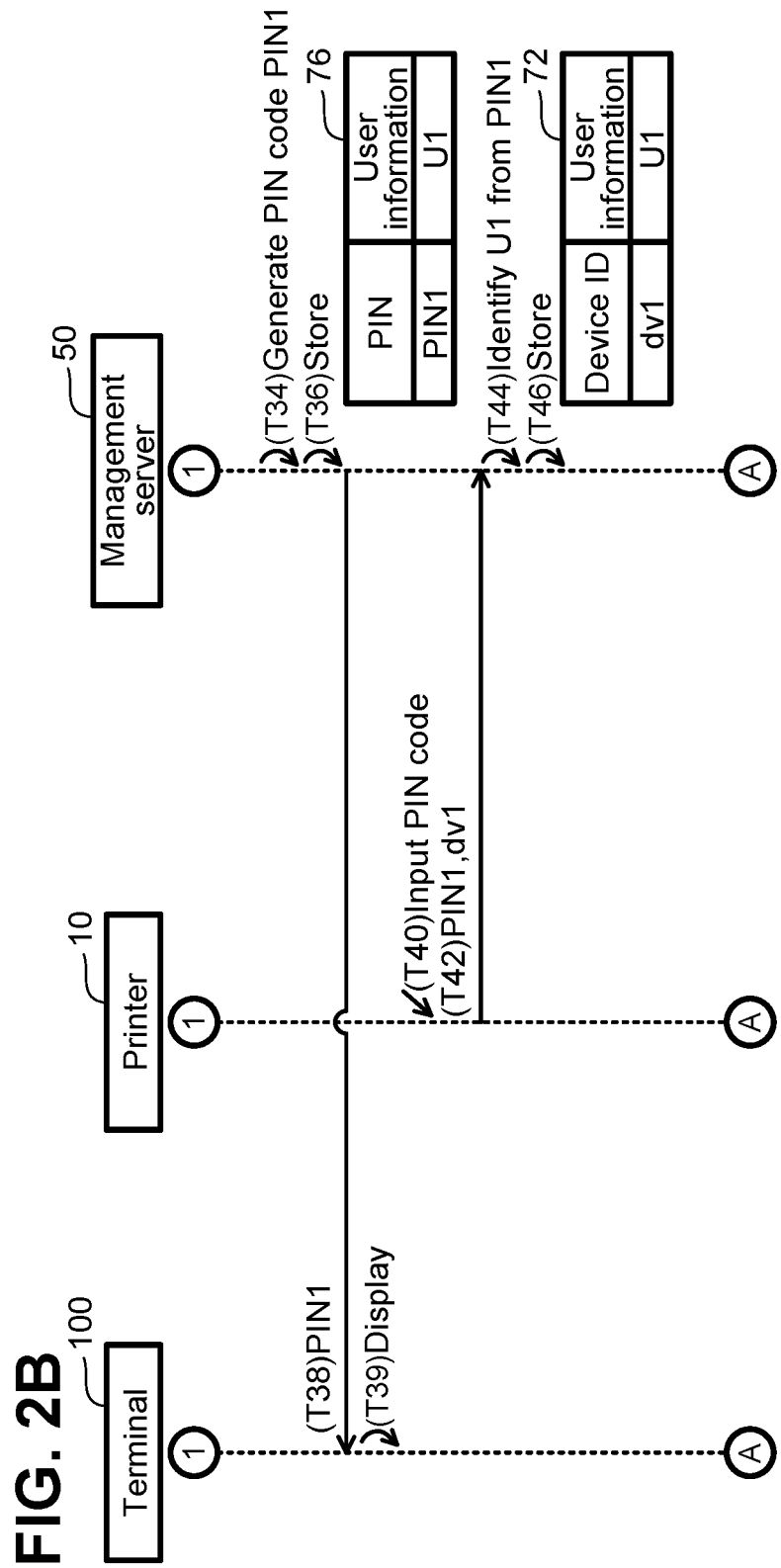

(Case A)

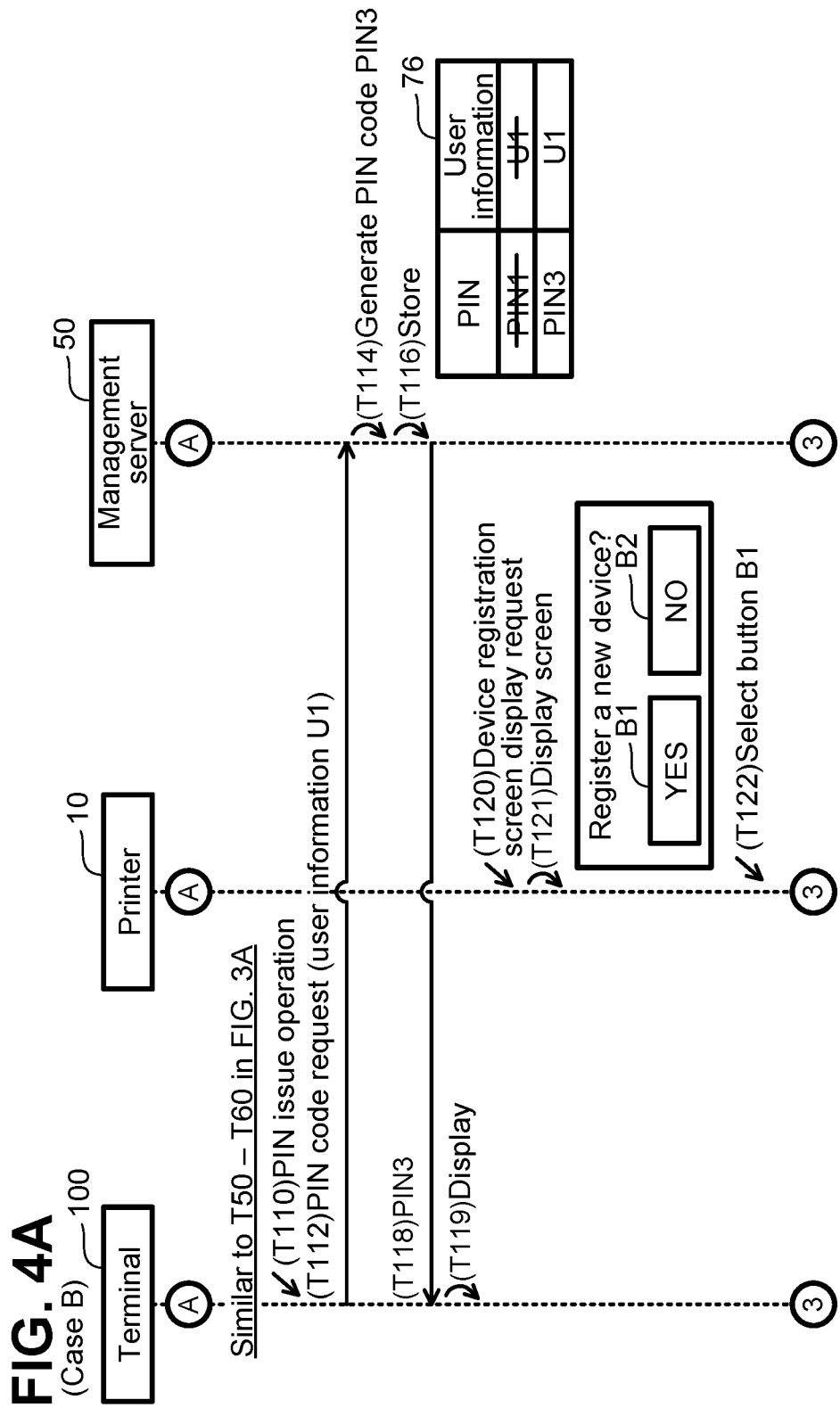

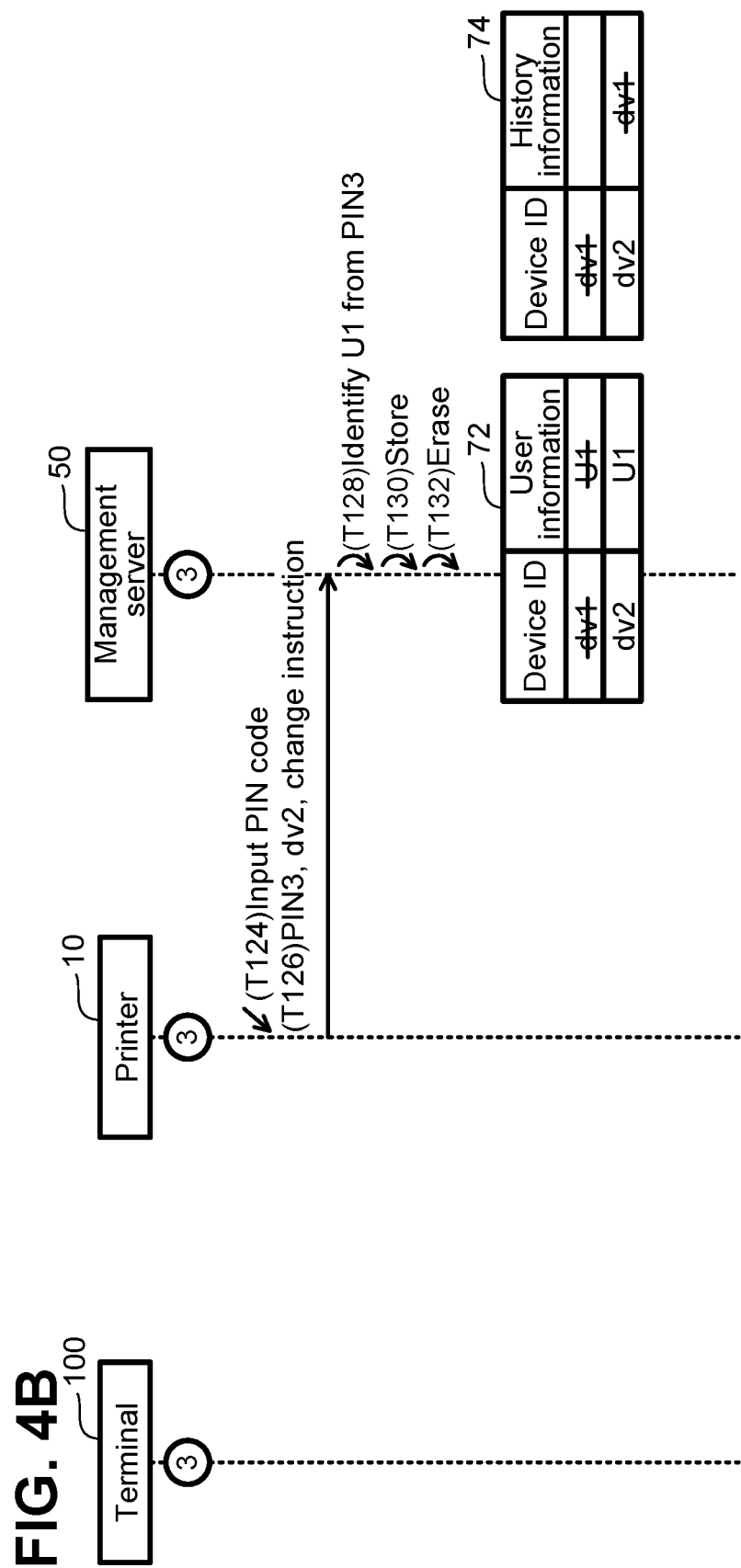

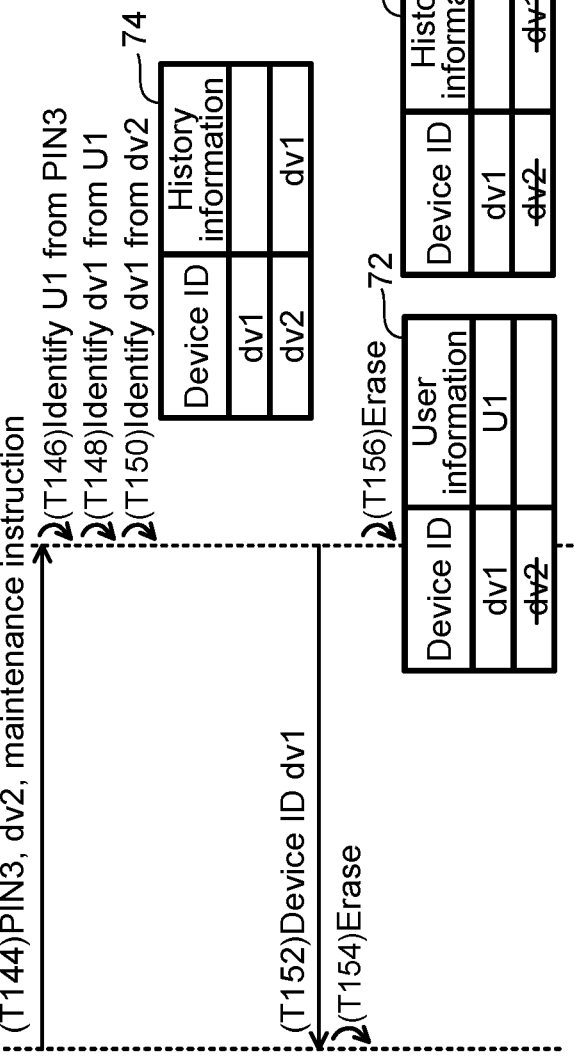

SERVER AND COMPUTER PROGRAM FOR SERVER

CROSS-REFERENCE TO RELATED APPLICATION

This application claims priority from Japanese Patent Application No. 2021-030862 filed on Feb. 26, 2021, the content of which is incorporated herein by reference in its entirety.

TECHNICAL FIELD

Aspects of the disclosure relate to a server that stores identification information identifying a communication device and user information in association with each other.

BACKGROUND

A known system includes a server and an information device. The server manages information on a state of the information device by storing a device ID and an account of the information device in association with each other.

SUMMARY

According to an aspect of the disclosure, a server includes memory, a request receiver, a first transmitter, a second transmitter, and a first memory controller. The memory includes a first table configured to store first identification information identifying a communication device and first user information in association with each other. In response to a reset instruction to reset the first identification information being input at the communication device storing the first identification information, the request receiver receives the first identification information, and an identification information request from the communication device. The identification information request requests an allocation of new identification information identifying the communication device. In response to the first identification information and the identification information request being received from the communication device, the first transmitter transmits second identification information different from the first identification information to the communication device. The second identification information is to be stored in the communication device instead of the first identification information. In response to the second identification information and first related information related to the first user information being received from the communication device after the second identification information is stored in the communication device, the second transmitter transmits the first identification information to the communication device. The first identification information is to be stored in the communication device instead of the second identification information. In response to the second identification information and second related information related to second user information different from the first user information being received from the communication device after the second identification information is stored in the communication device, the first memory controller allows the first table to store the second identification information and second user information in association with each other.

According to an aspect of the disclosure, a server includes memory, a request receiver, a first transmitter, a second transmitter, and a fifth memory controller. The memory includes a first table configured to store first identification information identifying a communication device and first user information in association with each other. In response to a reset instruction to reset the first identification information being input at the communication device storing the first identification information, the request receiver receives the first identification information, and an identification information request from the communication device. The identification information request requests an allocation of new identification information identifying the communication device. In response to the first identification information and the identification information request being received from the communication device, the first transmitter transmits second identification information different from the first identification information to the communication device. The second identification information is to be stored in the communication device instead of the first identification information.

The second transmitter transmits the first identification information to the communication device in response to a first instruction being received from a specific external device. The first instruction is received from the specific external device in response to maintenance of identification information being selected on a selection screen displayed on the specific external device after the second identification information is stored in the communication device. The first identification information is to be stored in the communication device instead of the second identification information. The fifth memory controller allows the first table to store the second identification information and the first user information in association with each other in response to a second instruction being received from the specific external device. The second instruction is received from the specific external device in response to a change of identification information being selected on the selection screen displayed on the specific external device.

According to an aspect of the disclosure, a non-transitory computer readable storage mediums stores a computer program for a server including memory and a computer. The memory includes a first table to store first identification information identifying a communication device and first user information in association with each other. The computer program includes instructions that, when executed, cause the computer to function as a request receiver, a first transmitter, a second transmitter, and a first memory controller, which are described above.

According to an aspect of the disclosure, a non-transitory computer readable storage mediums stores a computer program for a server including memory and a computer. The memory includes a first table to store first identification information identifying a communication device and first user information in association with each other. The computer program includes instructions that, when executed, cause the computer to function as a request receiver, a first transmitter, a second transmitter, and a fifth memory controller, which are described above.

BRIEF DESCRIPTION OF THE DRAWINGS

FIG. 2A is a sequence diagram of a registration process.

FIG. 2B is a sequence diagram continued from FIG. 2A.

FIG. 4A is a sequence diagram of case B in which the user of the printer is identical and a device ID of the printer is changed before and after a factory reset.

FIG. 4B is a sequence diagram continued from FIG. 4A.

FIG. 5 is a sequence diagram of case B in which the user of the printer is identical and a device ID of the printer is changed before and after a factory reset.

DETAILED DESCRIPTION

This disclosure provides a server capable of performing appropriate processing in response to a reset instruction to reset identification information identifying a communication device being input at the communication device.

Figure 1:
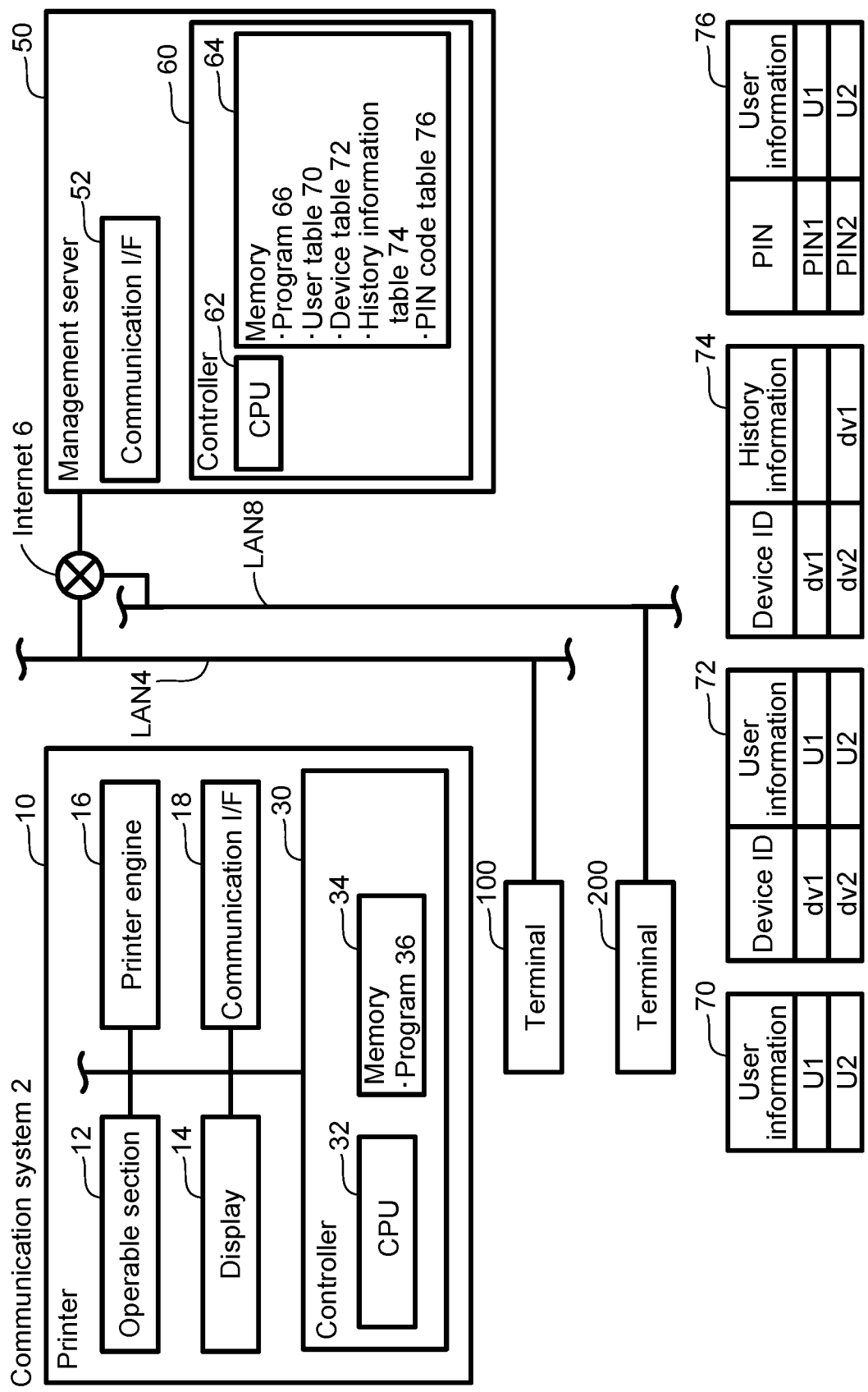
FIG. 1 is a configuration diagram of a communication system.

Configuration of Communication System 2: FIG. 1

As illustrated in FIG. 1, a communication system 2 includes devices such as a printer 10, a plurality of terminals 100 and 200, and a management server 50. The printer 10 and the terminal 100 belong to a local area network (LAN) 4 and can communicate with each other via the LAN 4. When the printer 10 belongs to a LAN 8 instead of the LAN 4, the printer 10 can communicate with the terminal 200 via the LAN 8. Each of the LANs 4 and 8 may be either a wired or wireless LAN. Each of the LANs 4 and 8 is connected to the Internet 6. The management server 50 is connected to the Internet 6. The devices 10, 50, and 100 (or 200) can communicate with each other via the Internet 6.

Configuration of Printer 10

The printer 10 is a peripheral device (of, for example, the terminals 100 and 200) having a print function. The printer 10 may be a multifunction peripheral capable of performing a scan function, and a FAX function in addition to the print function. The printer 10 includes an operable section 12, a display 14, a printer engine 16, a communication interface (hereinafter referred to as an "I/F") 18, and a controller 30.

The operable section 12 includes a plurality of keys. The user can input various instructions to the printer 10 by operating the operable section 12. The display 14 is a display for displaying various information. The display 14 also functions as a so-called touchscreen (i.e., an operable section). The printer engine 16 is a print mechanism of an inkjet type, a laser type, or other type. The communication I/F 18 is connected to the LAN 4. The communication I/F 18 may be a wireless I/F or a wired I/F.

The controller 30 includes a CPU 32 and memory 34. The CPU 32 performs various processing in accordance with a program 36 stored in the memory 34. The memory 34 includes a volatile memory and a nonvolatile memory. The memory 34 stores a device ID identifying the printer 10. The device ID is unique information generated by the management server 50.

Configuration of Management Server 50

The management server 50 is a so-called web server and is installed on the Internet 6 by a vendor of the printer 10. In one example, the management server 50 functions as a service providing server that collects information on various printers including the printer 10 and notifies a printer administrator of the information. In another example, the management server 50 may function as a mediation server that transmits information on various printers including the printer 10 to other service providing servers and transmits commands to the printers in accordance with instructions from the other service providing servers. In either example, the management server 50 stores a device ID identifying a printer, and user information identifying a user of the printer in association with each other.

The management server 50 includes a communication I/F 52 and a controller 60. The devices 52 and 60 are connected to a bus line (reference numeral is omitted). The communication I/F 52 is connected to the Internet 6. The controller 60 includes a CPU 62 and memory 64. The CPU 62 performs various processing in accordance with a program 66 stored in the memory 64. The memory 64 includes a volatile memory and a nonvolatile memory. The memory 64 stores a user table 70, a device table 72, a history information table 74, and a PIN (Personal Identification Number) code table 76 in addition to the program 66 described above.

The user table 70 stores user information (e.g., U1). The user information is information identifying a user, and includes, for example, a username and a password. The user information is set to any value by the user.

The device table 72 stores a device ID and the user information in association with each other. The device ID identifies the printer 10 (e.g., dv1).

The history information table 74 stores a device ID and history information in association with each other. The history information indicates a device ID assigned to the printer immediately before the current device ID is assigned to the printer.

The PIN code table 76 stores user information and a PIN code in association with each other. The PIN code is used to associate the device ID with the user information in processes to be described later (refer to FIGS. 2 to 5).

Registration Process: FIGS. 2A and 2B

With reference to FIGS. 2A and 2B, a process for registering a device ID and user information in the device table 72 of the management server 50 will be described. In the initial state of FIG. 2A, the printer 10 and the terminal 100 belong to the same LAN 4. The printer 10 has not yet been assigned a device ID.

In the following description, the processing performed by a CPU of each device (for example, the CPU 32) is described as the processing performed by a device (for example, the printer 10) for ease of understanding. Communication performed by the devices is performed via communication I/Fs of the devices (for example, communication I/F 18 of the printer 10). Therefore, in the following description, when processing related to communication via a communication I/F is described, the phrase "via the communication I/F" is omitted.

At T5, the user performs a registration operation including inputting user information U1 to the terminal 100. The registration operation is an operation to register the user information U1 in the management server 50. Next, at T10, the terminal 100 transmits a registration request including the user information U1 to the management server 50.

Upon receiving the registration request from the terminal 100 at T10, the management server 50 stores the user information U1 included in the registration request in the user table 70 at T12.

The user then performs a registration operation on the printer 10 at T15. The registration operation is an operation to register a device ID of the printer 10 in the management server 50. In this case, at T20, the printer 10 transmits a device registration request to the management server 50. Alternatively, the device registration request may include a model name and a serial number of the printer 10.

Upon receiving the device registration request from the printer 10 at T20, the management server 50 generates a device ID dv1 at T22 and stores the device ID dv1 in the device table 72 and the history information table 74 at T24. At this point, in the device table 72, user information is not stored in association with the deice ID dv1. In the history information table 74, history information is not stored in association with the device ID dv1. The management server 50 then transmits the device ID dv1 to the printer 10 at T26. In a modification, when the device registration request includes a model name and a serial number of the printer 10, the management server 50 may further store the model name and the serial number of the printer 10 in the memory 64 in association with the device ID dv1.

Upon receiving the device ID dv1 from the management server 50 at T26, the printer 10 stores the device ID dv1 at T28. That is, the device ID dv1 is assigned to the printer 10.

Upon receiving a PIN issue operation performed by the user at T30, the terminal 100 transmits a PIN code request including the user information U1 to the management server 50 at T32.

Upon receiving the PIN code request from the printer 100 at T32, the management server 50 generates a PIN code PN1 at T34, and stores the user information U1 included in the PIN code request and the generated PIN code PIN1 in association with each other in the PIN code table 76 at T36. Th management server 50 then transmits the PIN code PN1 to the terminal 100 at T38. Thus, at T39, the terminal 100 displays the PIN code PIN1. This allows the user to know the PIN code PIN1.

After viewing the PIN code displayed on the terminal 100, the user inputs the PIN code PIN1 to the printer 10 at T40. In this case, the printer 10 transmits the PIN code PIN1 and the device ID dv1 to the management server 50.

Upon receiving the PIN code PIN1 and the device ID dv1 from the printer 10 at T42, the management server 50 identifies the user information U1 associated with the received PIN code PIN1 from the PIN code table 76 at T44. The management server 50 then stores the identified user information U1 in the device table 72 in association with the received device ID dv1 at T46.

As described above, the management server 50 stores the device ID dv1 of the printer 10 and the user information U1 in association with each other. The management server 50 can thus provide a service to the user of the printer 10 (i.e., the user of the terminal 100) and mediate communication between the printer 10 and a service providing server. The service may include, for example, a remote printing service, a remote scanning service, an automatic consumable shipping service, and a printer remote management service.

Case where a Factory Reset is Performed

With reference to FIGS. 3 to 5, three cases A to C in which a factory reset of the printer 10 is performed by the user after the processing of FIGS. 2A and 2B will be described. A factory reset is used to reset the internal state of the printer 10 to the state at the time when the printer 10 was shipped by erasing all information (e.g., setting information) stored in the printer 10. In the initial state of each of FIGS. 3 to 5, the device ID dv1 and the user information U1 are stored in association with each other in the device table 72 (refer to T46 in FIG. 2B).

Figure 3A:
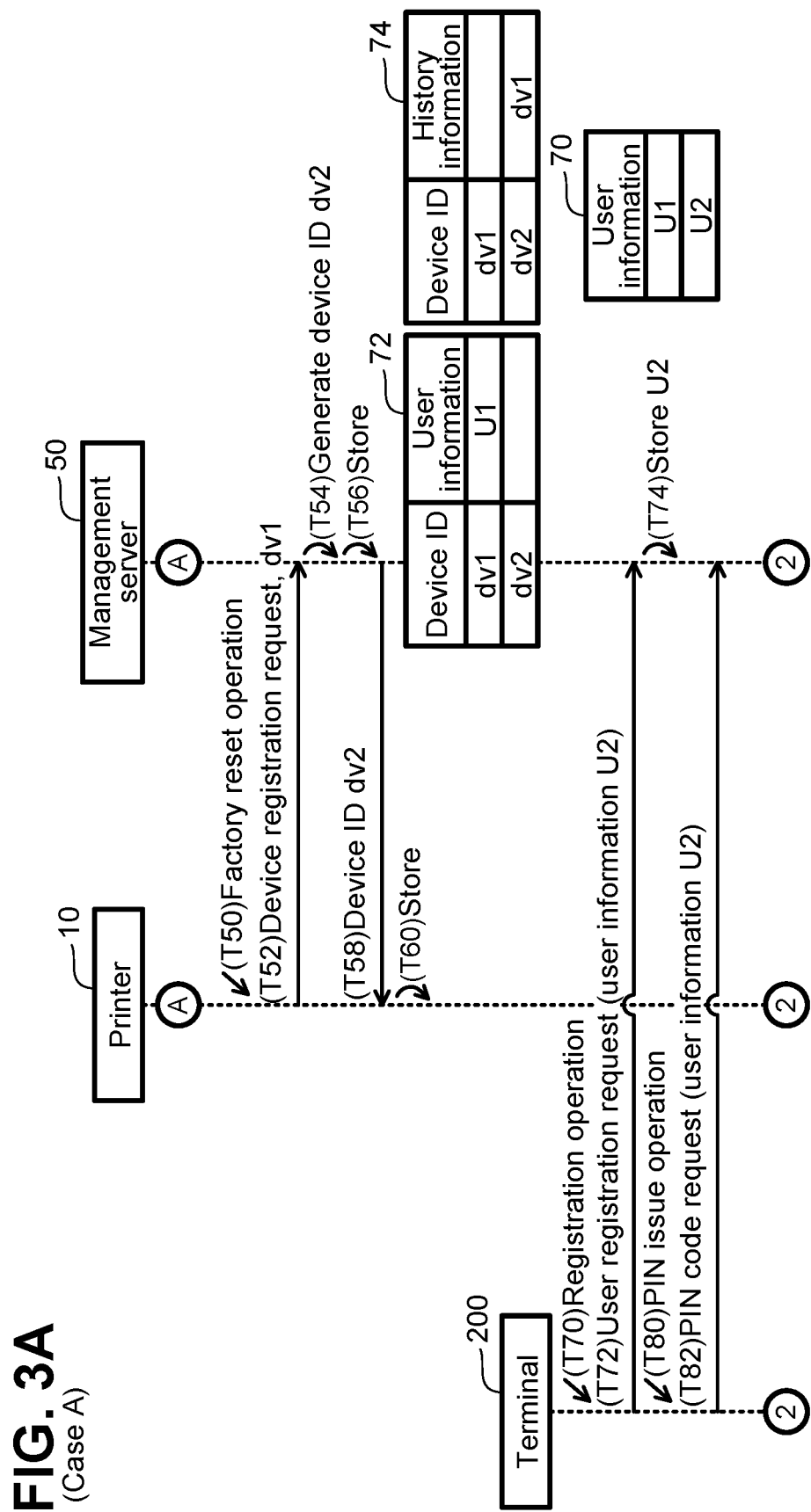
FIG. 3A is a sequence diagram of case A in which a user of a printer is different before and after a factory reset.
Figure 3B:
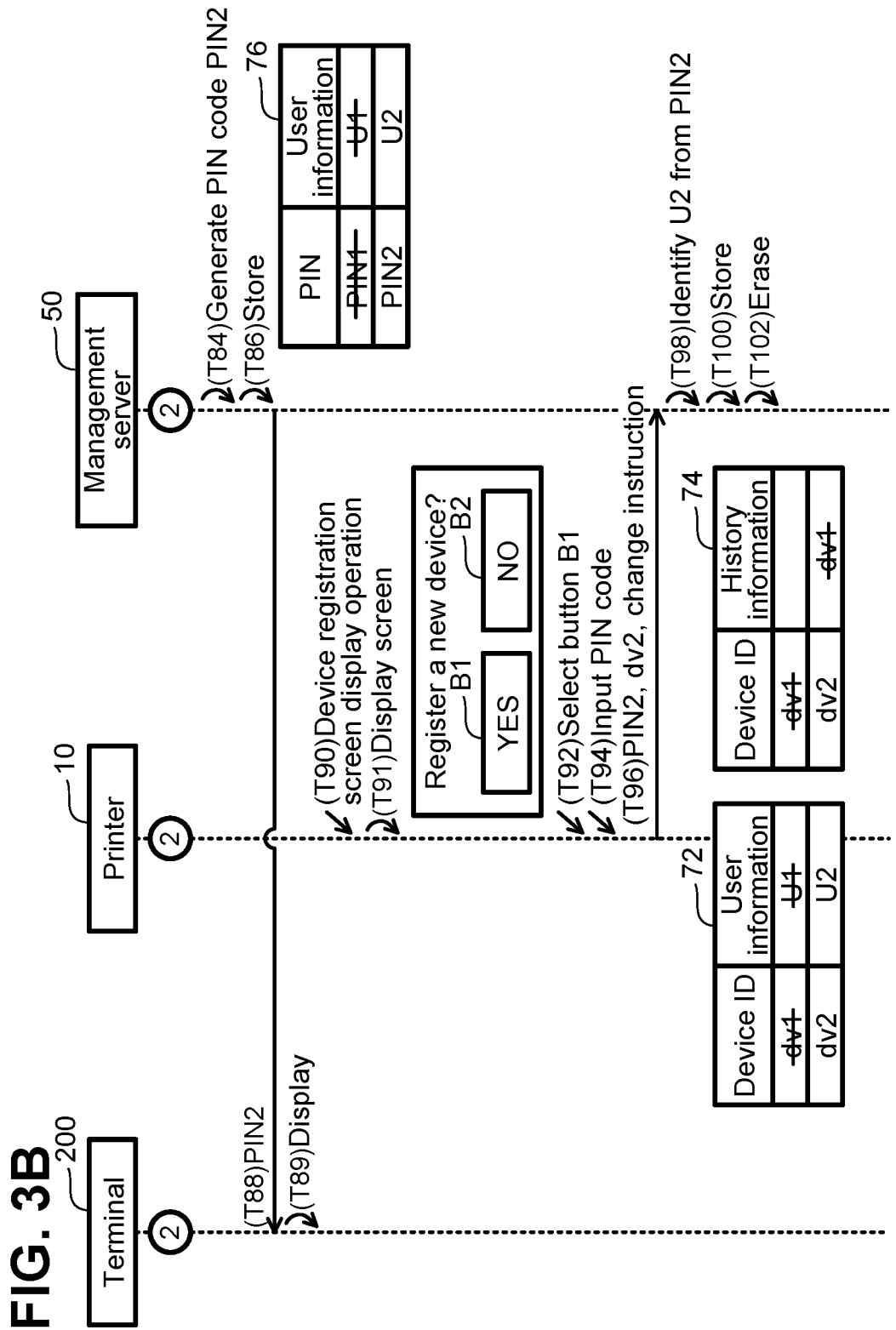
FIG. 3B is a sequence diagram continued from FIG. 3A.

Case A: FIGS. 3A and 3B

In case A in FIGS. 3A and 3B, a factory reset is performed on the printer 10 by the user of the terminal 100 before the printer 10 is transferred to a user of the terminal 200. That is, the user of the printer 10 changes.

Upon receiving a factory reset operation performed by the user of the terminal 100 at T50, the printer 10 performs a factory reset. At this time, the printer 10 erases various information except for the device ID dv1 (e.g., default print setting, and information for performing user authentication) from the memory 34. The printer 10 transmits a device registration request and the device ID dv1 to the management server 50 at T52. The device registration request is a command for requesting allocation of a new device ID.

Upon receiving the registration request and the device ID dv1 from the printer 10 at T52, the management server 50 generates a new device ID dv2 different from the received device ID dv1 at T54. Then, at T56, the management server 50 stores the device ID dv2 in the device table 72, and stores the received device ID dv1 associated with the new device ID dv2 as history information in the history information table 74. At this point, in the device table 72, user information is not stored in association with the deice ID dv2. The management server 50 then transmits the device ID dv2 to the printer 10 at T58.

Upon receiving the device ID dv2 from the mediation server 50 at T58, the printer 10 stores the received device ID dv2 instead of the device ID dv1 at T60. This changes the device ID to be assigned to the printer 10.

As described above, the device ID of the printer 10 can be changed when a factory reset is performed. Thus, for example, when the printer 10 is transferred, this prevents a new user from using the original device ID, that is, from receiving a service corresponding to the original device ID.

Then, the printer 10 is transferred to the user of the terminal 200, and the printer 10 is connected to the LAN 8. At T70, the user of the terminal 200 performs a registration operation, on the terminal 200, that includes inputting user information U2 different from the user information U1. Next, at T72, the terminal 200 transmits a user registration request including the user information U2 to the management server 50.

Upon receiving the user registration request at T72, the management server 50 stores the user information U2 included in the user registration request in the user table 70 at T74.

Upon receiving a PIN issue operation performed by the user at T80, the terminal 200 transmits a PIN code request including the user information U2 to the management server 50 at T82.

Upon receiving the PIN code request from the terminal 200 at T82, the management server 50 generates a PIN code PN2 at T84, and stores the user information U2 included in the PIN code request and the generated PIN code PIN2 in association with each other in the PIN code table 76 at T86. Th management server 50 then transmits the PIN code PN2 to the terminal 200 at T88. Thus, at T89, the terminal 200 displays the PIN code PIN2. This allows the user to know the PIN code PIN2.

After viewing the PIN code PIN2 displayed on the terminal 200, the user performs a device registration screen display operation on the printer 10 at T90. In this case, the printer 10 displays a device registration screen at T91. The device registration screen is a screen for prompting the user to confirm whether to newly register a device, that is, whether to use the changed device ID dv2 or to maintain the original device ID dv1. The device registration screen includes a button B1 indicating the character string "YES" and a button B2 indicating the character string "NO".

Upon receiving the selection of the button B1 on the device registration screen at T92 and the input of the PIN code PIN2 at T94, the printer 10 transmits the PIN code PIN2, the device ID dv2, and a change instruction indicating that the changed device ID dv2 is used to the management server 50 at T96.

Upon receiving the PIN code PIN2, the device ID dv2, and the change instruction from the printer 10 at T96, the management server 50 identifies the user information U2 associated with the received PIN code PIN2 from the PIN code table 76 (refer to T86) at T98. Thus, the management server 50 can identify the user information U2 to be stored in association with the device ID dv2. The management server 50 stores the identified user information U2 in the device table 72 in association with the received device ID dv2 at T100.

The management server 50 then erases information related to the device ID dv1 at T102. More specifically, the management server 50 erases the device ID dv1 and the user information U1 associated with the device ID dv1 from the device table 72. This prevents the original device ID dv1 of the printer 10 and the user information U1 from being used by a third party. The management server 50 erases the device ID dv1 from a column of the device ID in the history information table 74 and erases the device ID dv1 associated with the device ID dv2 from a column of the history information in the history information table 74. Thus, in the management server 50, all information related to the device ID dv1 is erased, so that the original device ID dv1 of the printer 10 can be prevented from being used by a third party. In a modification, the management server 50 may transmit the device ID dv2 to the printer 10 after the processing at T100 or T102.

Effect of Case A

As in case A described above, when the user of the printer 10 is different before and after the factory reset is input, the management server 50 causes the printer 10 to store the device ID dv2 (T60 in FIG. 3A) instead of the device ID dv1 (refer to T28 in FIG. 2A). Then, in response to receiving the device ID dv2 and the PIN2 associated with the user information U2 from the printer 10 (T96), the management server 50 can store the device ID dv2 and the user information U2 in association with each other (T100). In this manner, when the user of the printer 10 changes before and after the factory reset is input, the management server 50 enables the printer 10 to use a new device ID dv2 different from the original device ID dv1. Further, since the management server 50 stores the device ID dv2 and the user information U2 in association with each other, services relating to the printer 10 identified by the device ID dv2 can be provided to the user of the terminal 200 identified by the user information U2.

Case B: FIGS. 4A and 4B

In case B in FIGS. 4A and 4B, the user of the printer 10 does not change before and after a factory reset. For example, for the printer 10 to perform printing in a secure state, the user of the terminal 100 performs a factory reset on the printer 10.

A sequence of processing steps similar to those at T50 to T60 in FIG. 3A is performed. As a result, a factory reset is performed on the printer 10, and a new device ID dv2 is stored in the printer 10 (refer to T60 in FIG. 3A). Upon receiving a PIN issue operation performed by the user at T110, the terminal 100 transmits a PIN code request including the user information U1 to the management server 50 at T112.

Upon receiving the PIN code request from the terminal 100 at T112, the management server 50 generates a PIN code PN3 at T114, and stores the user information U1 included in the PIN code request and the generated PIN code PINS in association with each other in the PIN code table 76 at T116. Th management server 50 then transmits the PIN code PN3 to the terminal 100 at T118. Thus, at T119, the terminal 100 displays the PIN code PIN3. This allows the user to know the PIN code PIN3.

After viewing the PIN code PIN3 displayed on the terminal 100, the user performs a device registration screen display operation on the printer 10 at T120. The printer 10 displays a device registration screen at T121. Upon receiving the selection of the button B1 on the device registration screen performed by the user at T122 and the input of the PIN code PIN3 performed by the user at T124, the printer 10 transmits the PIN code PIN3, the device ID dv2, and a change instruction to the management server 50 at T126.

Upon receiving the PIN code PIN3, the device ID dv2, and the change instruction from the printer 10 at T126, the management server 50 identifies the user information U1 associated with the received PIN code PIN3 from the PIN code table 76 (refer to T116) at T128. Thus, the management server 50 can identify the user information U1 to be stored in association with the device ID dv2. The management server 50 stores the identified user information U1 in the device table 72 in association with the received device ID dv2 at T130.

The management server 50 then erases information related to the device ID dv1 at T132. The processing at T132 is similar to that at T102 in FIG. 3B. In a modification, the management server 50 may transmit the device ID dv2 to the printer 10 after the processing at T130 or T132.

Effect of Case B

In case B described above, the user of the printer 10 is unchanged before and after the factory reset is input, and changes the device ID of the printer 10. In this case, the management server 50 allows the printer 10 to store a new device ID dv2 instead of the device ID dv1 (T60 referred to in FIG. 4A). In response to a change of the device ID being selected on the device registration screen displayed on the printer 10 (at T121), the management server 50 allows the user to use the new device ID dv2 different from the original device ID dv1. Therefore, the user can use the printer 10 in a more secure state. The management server 50 stores the device ID dv2 and the user information U1 in association with each other (T130), thus providing the user with a service relating to the printer 10 identified by the new device ID dv2 without changing the user information U1. Since the user information U1 used by the management server 50 is not changed, the user can receive a service by using the same user information U1.

Case C: FIG. 5

In case C in FIG. 5, as in case B, the user of the printer 10 does not change before and after a factory reset. In case C, however, the user performs a factory reset on the printer 10 to use the printer 10 in a secure state, but does not change the device ID of printer 10.

After a sequence of processing steps similar to those at T50 to T60 in FIG. 3A is performed, a sequence of processing steps similar to those at T110 to T121 in FIG. 4A is performed. As a result, the printer 10 displays a device registration screen. Upon receiving the selection of the button B2 on the device registration screen performed by the user at T140 and the input of the PIN code PIN3 performed by the user at T142, the printer 10 transmits the PIN code PIN3, the device ID dv2, and a maintenance instruction indicating that the original device ID dv1 is maintained to the management server 50 at T144.

Upon receiving the PIN code PIN3, the device ID dv2, and the maintenance instruction from the printer 10 at T144, the management server 50 identifies the user information U1 associated with the received PIN code PIN3 from the PIN code table 76 (refer to T116 in FIG. 4A) at T146. The server 50 then identifies a device ID dv1 associated with the identified user information U1 from the device table 72 (refer to T56 in FIG. 3A) at T148. Thus, the management server 50 can identify the original device ID dv1 assigned to the printer 10.

The server 50 then identifies a device ID dv1 associated with the received device ID dv2 (refer to T144) from the history information table 74 at T150. Thus, the management server 50 can identify the original device ID dv1 assigned to the printer 10.

The management server 50 determines whether the original device ID dv1 identified at T148 coincides with the original device ID dv1 identified at T150. In response to determining that both coincide with each other as in this case, the management server 50 transmits the identified device ID dv1 to the printer 10 at T152. In response to determining that both do not coincide with each other, the management server 50 does not transmit the device ID dv1 to the printer 10.

Upon receiving the device ID dv1 from the mediation server 50 at T152, the printer 10 stores the received device ID dv1 instead of the device ID dv2 at T154. Thus, the device ID to be assigned to the printer 10 is changed (i.e., returned to the original device ID dv1).

The management server 50 then erases information related to the device ID dv2 at T156. More specifically, the management server 50 erases the device ID dv2 from the device table 72. The management server 50 erases the device ID dv2 from a column of the device ID in the history information table 74 and erases the device ID dv1 associated with the device ID dv2 from a column of the history information in the history information table 74. Thus, all information related to the device ID dv2 is erased. This avoids detection of the current device ID dv1 of the printer 10 by a third party from the device ID dv2, even if the device ID dv2 leaks from the management server 50 to the outside. This prevents deterioration in the security of the printer 10.

Effect of Case C

In case C described above, the user of the printer 10 is unchanged before and after the factory reset is input, and does not change the device ID of the printer 10. In this case, the management server 50 allows the printer 10 to store the device ID dv2 (T60 referred to in FIG. 5), instead of the device ID dv1 (refer to T28 in FIG. 2A). In response to receiving the device ID dv2 and PINS related to the user information U1 from the printer 10 (T144), the management server 50 allows the printer 10 to store the device ID dv1 instead of the device ID dv2 (T154). In particular, the management server 50 allows the printer 10 to use the original device ID dv1 in response to maintenance of the device ID being selected on the device registration screen displayed on the printer 10 (at T121 referred to in FIG. 5). Therefore, the user can use the printer 10 in a secure state and with the original device ID by a factory reset. The management server 50 maintains a state in which the device ID dv1 and the user information U1 are stored in association with each other, thus providing the user with a service relating to the printer 10 without changing the device ID dv1 and the user information U1. Since the user information U1 used by the management server 50 is not changed, the user can receive a service by using the same user information U1. Since the device ID dv1 of the printer 10 used by the management server 50 is not changed, the user does not have to change the device ID of the printer 10 used by a service providing server cooperating with the management server 50.

Effects of Embodiment

As illustrated in case A of FIGS. 3A and 3B and case C of FIGS. 5A and 5B, the management server 50 allows the printer 10 to use an appropriate device ID depending on whether the user of the printer 10 changes before and after the factory reset is input.

As illustrated in case A in FIGS. 3A and 3B and case B in FIGS. 4A and 4B, the management server 50 further allows the printer 10 to use an appropriate device ID depending on whether the change of the device ID or the maintenance of the device ID is selected after the factory reset.

Correspondence Relationship

The management server 50 is an example of a "server", the printer 10 is an example of an "communication device", the terminal 100 is an example of a "first external device", and the terminal 200 is an example of a "second external device". The device ID dv1 is an example of "first identification information", and the device ID dv2 is an example of "second identification information". The user information U1 is an example of "first user information", and the user information U2 is an example of "second user information". The device table 72 is an example of a "first table", the PIN code table 76 is an example of a "second table", and the history information table 74 is an example of a "third table". The memory 64 of the management server 50 is an example of "memory". A factory reset is an example of a "reset instruction". The device registration request at T52 in FIG. 3A is an example of an "identification information request". PIN3 at T144 in FIG. 5 is an example of "first related information related to the first user information", and PIN2 at T96 in FIG. 3B is an example of "second related information related to the second user information". The device registration screen is an example of a "selection screen". The button B2 being selected on the device registration screen illustrated in FIG. 5 (i.e., T140) is an example of "maintenance of identification information being selected". The button B1 being selected on the device registration screen illustrated in FIG. 4A (i.e., T122) is an example of "a change of identification information being selected". The maintenance instruction is an example of a "first instruction", and the change instruction is an example of a "second instruction". The printer 10 is an example of a "specific external device".

The correspondence relationship in a "server" is described. The processing at T52 in FIG. 3A and T52 referred to in FIG. 5 is an example of processing performed by a "request receiver". The processing at T58 in FIG. 3A and T58 referred to in FIG. 5 is an example of processing performed by a "first transmitter". The processing at T152 in FIG. 5 is an example of processing performed by a "second transmitter". The processing at T100 in FIG. 3B is an example of processing performed by a "first memory controller". The processing at T116 in FIG. 5 is an example of processing performed by a "second memory controller". The processing at T118 referred to in FIG. 5 is an example of processing performed by a "first related information transmitter". The processing at T56 in FIG. 3A and T56 referred to in FIG. 5 is an example of processing performed by a "third memory controller". The processing at T156 in FIG. 5 is an example of processing performed by an "eraser". The processing at T86 in FIG. 3B is an example of processing performed by a "fourth memory controller". The processing at T88 in FIG. 3B is an example of processing performed by a "second related information transmitter". The processing at T130 in FIG. 4B is an example of processing performed by a "fifth memory controller".

The correspondence relationship in another "server" is described. The processing at T52 in FIG. 4A and T52 referred to in FIG. 5 is an example of processing performed by a "request receiver". The processing at T58 in FIG. 4A and T58 referred to in FIG. 5 is an example of processing performed by a "first transmitter". The processing at T116 in FIG. 4A is an example of processing performed by a "second memory controller". The processing at T118 in FIG. 4A is an example of processing performed by a "first related information transmitter". The processing at T56 in FIG. 4A is an example of processing performed by a "third memory controller".

Although specific examples of the disclosure have been described in detail above, these are merely examples and do not limit the scope of the claims. The technology described in the claims includes various modifications and changes of the specific examples illustrated above. Modifications of the above embodiment are enumerated below.

In a first modification, the "reset instruction" is not limited to the factory reset operation, and may be another reset instruction. For example, the reset instruction may be an operation to reset a setting for communication with the management server 50. Generally speaking, the reset instruction may be any instruction to reset the first identification information.

In a second modification, the management server 50 in case C does not have to store the user information U1 and the PIN code PIN5 in the PIN code table 76 in association with each other at T116 in FIG. 4A, which is referred to in FIG. 5. In this case, when the processing at T118 to T119 in FIG. 4A referred to in FIG. 5 is not performed and the processing at T120 to T122 in FIG. 4A referred to in FIG. 5 is performed, the user inputs the user information U1 instead of the PIN code PIN3 at T142. The printer 10 thus transmits the device ID dv2 and the user information U1 to the management server 50 at T144. Upon receiving the device ID dv2, the user information U1, and the maintenance instruction at T144, the management server 50 identifies the device ID dv1 associated with the received user information U1 from the device table 72 and transmits the identified device IDddv1 to the printer 10 at T152. In this modification, the "second memory controller" and the "first related information transmitter" can be omitted.

In a third modification, at T110 in FIG. 4A referred to in FIG. 5, upon receiving a PIN code issue operation and an operation to select the use of the original device ID (i.e., the device ID dv1) performed by the user, the terminal 100 transmits a PIN code request including user information U1 and a maintenance instruction to the management server 50 at T112 in FIG. 4A referred to in FIG. 5. The management server 50 generates a PIN code PIN3 at T114 in FIG. 4A referred to in FIG. 5, and stores the maintenance instruction, the user information U1, and the generated PIN code PIN3 in association with each other at T116 in FIG. 4A referred to in FIG. 5. A sequence of processing steps similar to those at T118 to T120 in FIG. 4A referred to in FIG. 5 is performed. At T121 in FIG. 4A, which is referred to in FIG. 5, the device registration screen is not displayed and the processing at T140 is not performed. Upon receiving an input of PIN code PIN3 performed by the user at T142, the printer 10 transmits the PIN code PIN3 and the device ID dv2 to the management server 50 at T144. The management server 50 identifies the maintenance instruction and the user information U1 associated with the received PIN code PIN3 from the device table 76 at T146. Thereafter, a sequence of processing steps similar to those at T148 to T156 is performed. In this modification, in case C, the "first external device (or specific external device)" and the "communication device" are the same device.

In a fourth modification, the management server 50 in case C does not have to store the received device ID dv1 associated with the new device ID dv2, in the history information table 74, as history information, at T56 in FIG. 3A, which is referred to in FIG. 5. In this case, the processing at T150 is not performed. That is, the management server 50 does not have to use the history information table 74 to identify the original device ID dv1 assigned to the printer 10. In this modification, the "third memory controller" can be omitted.

In a fifth modification, the processing at T156 in FIG. 5 may not be performed. In this modification, the "eraser" can be omitted.

In a sixth modification, the management server 50 in case A does not have to store the user information U2 and the PIN code PIN2 in the PIN code table 76 in association with each other at T86 in FIG. 3B. When the processing at T88 to T89 is not performed and the processing at T90 to T92 is performed the user inputs the user information U2 instead of the PIN code at T94. The printer 10 thus transmits the device ID dv2, the user information U2, and a change instruction to the management server 50 at T96. Upon receiving the device ID dv2, the user information U2, and the change instruction at T96, the management server 50 stores the received device ID dv2 and the received user information U2 in association with each other at T100. In this modification, the "fourth memory controller" and the "second related information transmitter" can be omitted.

In a seventh modification, at T80 in FIG. 3A, upon receiving a PIN code issue operation and an operation to select not to use the original device ID dv1 performed by the user, the terminal 100 transmits a PIN code request including user information U2 and a change instruction to the management server 50 at T82. The management server 50 generates a PIN code PIN2 at T84 and stores the change instruction, the user information U2, and the generated PIN code PIN2 in association with each other at T86. A sequence of processing steps similar to those at T88 to T90 is performed. At T91, the device registration screen is not displayed and the processing at T92 is not performed. Upon receiving an input of PIN code PIN2 performed by the user at T94, the printer 10 transmits the PIN code PIN2 and the device ID dv2 to the management server 50 at T96. Upon receiving the PIN code PIN2 and the device ID dv2 at T96, the management server 50 identifies the change instruction and the user information U2 associated with the received PIN code PIN2 from the PIN code table 76 at T98. Thereafter, a sequence of processing steps similar to those at T100 and T102 is performed. In this modification, in case A, the "first external device" and the "communication device" are the same device. This modification is also applicable to case B in FIGS. 4A and 4B. In this case, the "specific external device" and the "communication device" are the same device.

In an eighth modification, the printer 10 in case A in FIGS. 3A and 3B to case C in FIGS. 5A and 5B does not have to display the device registration screen at T91 and T121. In this case, the processing at T92, T122, and T140 is not performed. Thus, the printer 10 transmits the PIN code and the device ID to the management server 50 at T96, T126, and T144. That is, in this modification, the maintenance instruction or the change instruction is not transmitted. Upon receiving the PIN code and the device ID dv2 from the printer 10, the management server 50 identifies user information associated with the received PIN code from the PIN code table 76. The management server 50 further identifies a device ID dv1 associated with the received device ID dv2 from the history information table 74. The management server 50 then identifies user information associated with the identified device ID dv1 from the device table 72. The management server 50 determines whether the user information already identified from the PIN code table 76 coincides with the user information already identified from the history information table 74 and the device table 72. In response to determining that the user information of both parties coincide with each other, the management server 50 determines that the printer 10 should use the original device ID dv1, and transmits the device ID dv1 to the printer 10 (refer to T152 of case C in FIG. 5). In response to determining that the user information of both parties does not coincide with each other, the management server 50 determines that the printer 10 should use the device ID dv2, and does not transmit the device ID dv1 to the printer 10 (refer to T100 and T102 of case A in FIG. 3B). As in this modification, case B in FIGS. 4A and 4B may not be achieved. In this modification, the "first instruction" and the "second instruction" can be omitted, and the "fifth memory controller" can be omitted.

In a ninth modification, the management server 50 in case B does not have to store the user information U1 and the PIN code PINS in the PIN code table 76 in association with each other at T116 in FIG. 4A. When the processing at T118 to T119 is not performed and the processing at T120 to T122 is performed, the user inputs user information U1 instead of the PIN code at T124. The printer 10 thus transmits the device ID dv2, the user information U1, and a change instruction to the management server 50 at T126. Upon receiving the device ID dv2, the user information U1, and the change instruction at T126, the management server 50 stores the received device ID dv2 and the received user information U1 in association with each other at T130. In this modification, the "second memory controller" and the "first related information transmitter" can be omitted.

In a tenth modification, in cases A to C of the above-described embodiment, the printer 10 performs a factory reset in response to receiving a factory reset operation performed by the user of the terminal 100 at T50 in FIG. 3A, and stores a new device ID dv2 at T60. Following the processing at T60, the processing at T50 to T60 may be performed again. In this case, the printer 10 performs a second factory reset and stores a new device ID dv3. Thereafter, through the processing at T70 or later, the management server 50 can store user information U1 or U2 in the device table 72 in association with the device ID dv3. The management server 50 thus allows the printer 10 to use a device ID different from (or identical to) the original device ID dv1. That is, in the technology disclosed by this technology, the number of times that a factory reset is performed is not particularly limited.

In an eleventh modification, the "communication device" may not be the printer 10, but may be another device such as a scanner, a multifunction peripheral, a mobile terminal, a PC, or a server.

In a twelfth modification, at least one of the processes in FIGS. 2 to 5 performed using software in the embodiment described above may be performed using hardware such as a logic circuit.

The technical elements described in this specification or the drawings each exhibit technical effects separately or in combination, and combinations of the elements are not limited to those described in the claims as filed. The techniques illustrated in the specification or the drawings may achieve a plurality of purposes at a time, and achieving one of the purposes may produce technical effects.

What is claimed is:
1. A server, comprising:
   memory including a first table configured to store first identification information identifying a communication device and first user information in association with each other;
   a request receiver configured to, in response to a reset instruction to reset the first identification information being input at the communication device storing the first identification information, receive the first identification information, and an identification information request from the communication device, the identification information request requesting an allocation of new identification information identifying the communication device;
   a first transmitter configured to, in response to the first identification information and the identification information request being received from the communication device, transmit second identification information different from the first identification information to the communication device, the second identification information being to be stored in the communication device instead of the first identification information;
   a second transmitter configured to, in response to the second identification information and first related information related to the first user information being received from the communication device after the second identification information is stored in the communication device, transmit the first identification information to the communication device, the first identification information being to be stored in the communication device instead of the second identification information; and
   a first memory controller configured to, in response to the second identification information and second related information related to second user information different from the first user information being received from the communication device after the second identification information is stored in the communication device, allow the first table to store the second identification information and second user information in association with each other.

2. The server according to claim 1,
   wherein the memory further includes a second table,
   wherein the server further comprises:
      a second memory controller configured to, in response to the first user information being received from a first external device after the second identification information is stored in the communication device, allow the second table to store the first user information and the first related information in association with each other; and
      a first related information transmitter configured to, in response to the first user information being received from the first external device after the second identification information is stored in the communication device, transmit the first related information to the first external device, the first related information being to be output from the first external device, and
   wherein the second transmitter is configured to, in response to the second identification information and the first related information being received from the communication device after the communication device receives the first related information from the first external device, identify the first user information associated with first related information from the second table, identify the first identification information associated with the first user information identified from the first table, and transmit the first identification information identified to the communication device.

3. The server according to claim 2, wherein the first external device is different from the communication device.

4. The server according to claim 1,
wherein the memory further includes a third table,
wherein the server further comprises a third memory controller configured to, in response to the first identification information and the identification information request being received from the communication device, allow the third table to store the first identification information and the second identification information in association with each other, and
wherein the second transmitter is configured to, in response to the second identification information and the first related information being received from the communication device after the second identification information is stored in the communication device, identify the first identification information associated with the second identification information from the third table, and transmit the first identification information identified to the communication device.

5. The server according to claim 4, further comprising an eraser configured to, in response to the first identification information being transmitted to the communication device, erase the first identification information and the second identification information from the third table.

6. The server according to claim 1,
wherein the memory further includes a second table,
wherein the server further comprises:
 a fourth memory controller configured to, in response to the second user information being received from a second external device after the second identification information is stored in the communication device, allow the second table to store the second user information and the second related information in association with each other; and
 a second related information transmitter configured to, in response to the second user information being received from the second external device after the second identification information is stored in the communication device, transmit the second related information to the second external device, the second related information being to be output from the second external device, and
wherein the first memory controller is configured to, in response to the second identification information and the second related information being received from the communication device after the communication device receives the second related information from the second external device, identify the second user information associated with the second related information from the second table, and allow the first table to store the second identification information and the second user information identified in association with each other.

7. The server according to claim 6, wherein the second external device is different from the communication device.

8. The server according to claim 1,
wherein the second transmitter is configured to:
 transmit the first identification information to the communication device in response to the second identification information, the first related information, and a first instruction being received from the communication device, wherein the second identification information, the first related information, and the first instruction are received from the communication device in response to maintenance of identification information being selected on a selection screen displayed on the communication device after the second identification information is stored in the communication device; and
 not transmit the first identification information to the communication device in response to the second identification information, the first related information, and a second instruction being received from the communication device, wherein the second identification information, the first related information, and the second instruction are received from the communication device in response to a change of identification information being selected on the selection screen displayed on the communication device after the second identification information is stored in the communication device, and
wherein the server further comprises a fifth memory controller configured to, in response to the second identification information, the first related information, and the second instruction being received from the communication device, allow the first table to store the second identification information and the first user information in association with each other.

9. A server, comprising:
memory including a first table configured to store first identification information identifying a communication device and first user information in association with each other;
a request receiver configured to, in response to a reset instruction to reset the first identification information being input at the communication device storing the first identification information, receive the first identification information, and an identification information request from the communication device, the identification information request requesting an allocation of new identification information identifying the communication device;
a first transmitter configured to, in response to the first identification information and the identification information request being received from the communication device, transmit second identification information different from the first identification information to the communication device, the second identification information being to be stored in the communication device instead of the first identification information;
a second transmitter configured to transmit the first identification information to the communication device in response to a first instruction being received from a specific external device, wherein the first instruction is received from the specific external device in response to maintenance of identification information being selected on a selection screen displayed on the specific external device after the second identification information is stored in the communication device, the first identification information being to be stored in the communication device instead of the second identification information; and
a fifth memory controller configured to allow the first table to store the second identification information and the first user information in association with each other in response to a second instruction being received from the specific external device, wherein the second instruction is received from the specific external device in response to a change of identification information being selected on the selection screen displayed on the specific external device.

10. The server according to claim 9, wherein the specific external device is different from the communication device.

11. The server according to claim 10,
wherein the memory further includes a second table,
wherein the server further comprises:
　a second memory controller configured to, in response to the first user information being received from a first external device after the second identification information is stored in the communication device, allow the second table to store the first user information and the first related information in association with each other; and
　a first related information transmitter configured to, in response to the first user information being received from the first external device after the second identification information is stored in the communication device, transmit the first related information to the first external device, the first related information being to be output from the first external device,
wherein the second transmitter is configured to, in response to the second identification information, the first related information, and the first instruction being received from the specific external device, identify the first user information associated with the first related information from the second table, identify the first identification information associated with the first user information identified from the first table, and transmit the first identification information identified to the communication device, wherein the second identification information, the first related information, and the first instruction are received from the specific external device in response to a first condition, the first condition including maintenance of identification information being selected on a selection screen displayed on the specific external device and the communication device receiving the first related information from the specific external device,
wherein the fifth memory controller is configured to, in response to the second identification information, the first related information, and the second instruction being received from the specific external device, identify the first user information associated with the first related information from the second table, and store the second identification information and the first user information identified in association with each other, wherein the second identification information, the first related information, and the second instruction are received from the specific external device in response to a second condition, the second condition including a change of identification information being selected on the selection screen displayed on the specific external device that is the communication device and the communication device receiving the first related information from the specific external device.

12. The server according to claim 11, wherein the first external device is different from the communication device.

13. The server according to claim 10,
wherein the memory further includes a third table,
wherein the server further comprises a third memory controller configured to, in response to the first identification information and the identification information request being received from the communication device, allow the third table to store the first identification information and the second identification information in association with each other, and
wherein the second transmitter is configured to, in response to the second identification information and the first instruction being received from the specific external device, identify the first identification information associated with the second identification information from the third table, and transmit the first identification information identified to the communication device, wherein the second identification information and the first instruction are received from the specific external device in response to maintenance of identification information being selected on the selection screen displayed on the specific external device that is the communication device after the second identification information is stored in the communication device.

14. The server according to claim 13, further comprising an eraser configured to, in response to the first identification information being transmitted to the communication device, erase the first identification information and the second identification information from the third table.

15. A non-transitory computer readable storage medium storing a computer program for a server including memory and a computer, the memory including a first table configured to store first identification information identifying a communication device and first user information in association with each other, the computer program comprising instructions that, when executed, cause the computer to function as:
　a request receiver configured to, in response to a reset instruction to reset the first identification information being input at the communication device storing the first identification information, receive the first identification information, and an identification information request from the communication device, the identification information request requesting an allocation of new identification information identifying the communication device;
　a first transmitter configured to, in response to the first identification information and the identification information request being received from the communication device, transmit second identification information different from the first identification information to the communication device, the second identification information being to be stored in the communication device instead of the first identification information;
　a second transmitter configured to, in response to the second identification information and first related information related to the first user information being received from the communication device after the second identification information is stored in the communication device, transmit the first identification information to the communication device, the first identification information being to be stored in the communication device instead of the second identification information; and
　a first memory controller configured to, in response to the second identification information and second related information related to second user information different from the first user information being received from the communication device after the second identification information is stored in the communication device, allow the first table to store the second identification information and second user information in association with each other.

16. A non-transitory computer readable storage medium storing a computer program for a server including memory and a computer, the memory including a first table configured to store first identification information identifying a communication device and first user information in association with each other, the computer program comprising instructions that, when executed, cause the computer to function as:
- a request receiver configured to, in response to a reset instruction to reset the first identification information being input at the communication device storing the first identification information, receive the first identification information, and an identification information request from the communication device, the identification information request requesting an allocation of new identification information identifying the communication device;
- a first transmitter configured to, in response to the first identification information and the identification information request being received from the communication device, transmit second identification information different from the first identification information to the communication device, the second identification information being to be stored in the communication device instead of the first identification information;
- a second transmitter configured to transmit the first identification information to the communication device in response to a first instruction being received from a specific external device, wherein the first instruction is received from the specific external device in response to maintenance of identification information being selected on a selection screen displayed on the specific external device after the second identification information is stored in the communication device, the first identification information being to be stored in the communication device instead of the second identification information; and
- a fifth memory controller configured to allow the first table to store the second identification information and the first user information in association with each other in response to a second instruction being received from the specific external device, wherein the second instruction is received from the specific external device in response to a change of identification information being selected on the selection screen displayed on the specific external device.

* * * * *